United States Patent
Chappell et al.

(10) Patent No.: US 8,401,753 B2
(45) Date of Patent: Mar. 19, 2013

(54) AUTOMATIC DOWNHILL SPEED CONTROL SYSTEM

(75) Inventors: Jonathan D. Chappell, Peoria, IL (US); Jason D. Bell, Dahinda, IL (US); Paul Graham, Co. Durham (GB); Richard Adams, Peterborough (GB); Keith F. Harvey, Peoria, IL (US); Stephen Thompson, Sunderland (GB); James V. Dornberger, Canton, IL (US)

(73) Assignee: Caterpillar Inc., Peoria, IL (US)

( * ) Notice: Subject to any disclaimer, the term of this patent is extended or adjusted under 35 U.S.C. 154(b) by 614 days.

(21) Appl. No.: 12/623,526

(22) Filed: Nov. 23, 2009

(65) Prior Publication Data

US 2011/0125376 A1    May 26, 2011

(51) Int. Cl.
- *B60W 10/04* (2006.01)
- *B60W 10/10* (2006.01)
- *B60W 40/06* (2006.01)
- *B60K 31/00* (2006.01)

(52) U.S. Cl. ............................ 701/65; 701/50
(58) Field of Classification Search .......... None
See application file for complete search history.

(56) References Cited

U.S. PATENT DOCUMENTS

| | | | |
|---|---|---|---|
| 4,648,291 A | 3/1987 | Klatt et al. | |
| 5,038,880 A | 8/1991 | Matsuoka et al. | |
| 5,351,540 A | 10/1994 | Gee | |
| 5,389,050 A | 2/1995 | Sakai et al. | |
| 5,428,531 A | 6/1995 | Hayafune | |
| 5,555,170 A | 9/1996 | Nakashima | |
| 5,957,552 A | 9/1999 | Claussen et al. | |
| 6,212,458 B1 | 4/2001 | Walenty et al. | |
| 6,233,514 B1 | 5/2001 | Claussen et al. | |
| 6,249,735 B1* | 6/2001 | Yamada et al. | 701/65 |
| 6,374,173 B1 | 4/2002 | Ehlbeck | |
| 6,915,201 B1 | 7/2005 | Ott et al. | |
| 7,100,998 B2 | 9/2006 | Holl | |
| 7,134,985 B2 | 11/2006 | Watanabe et al. | |
| 7,223,204 B2 | 5/2007 | Steen et al. | |
| 7,273,124 B2 | 9/2007 | Tatsuno et al. | |
| 7,400,961 B2* | 7/2008 | Rushing et al. | 701/70 |
| 7,410,447 B2 | 8/2008 | Jamzadeh | |
| 7,460,941 B2* | 12/2008 | Sychra et al. | 701/50 |
| 2005/0256624 A1 | 11/2005 | Sporl et al. | |
| 2006/0149450 A1 | 7/2006 | Taffin | |
| 2007/0090691 A1 | 4/2007 | Maskell et al. | |
| 2007/0099759 A1* | 5/2007 | Jamzadeh | 477/186 |
| 2007/0191181 A1 | 8/2007 | Burns | |
| 2007/0276576 A1 | 11/2007 | Inoue et al. | |
| 2008/0051968 A1 | 2/2008 | Belen et al. | |
| 2008/0125944 A1 | 5/2008 | Kamishima et al. | |
| 2008/0172162 A1* | 7/2008 | Wegeng et al. | 701/70 |
| 2008/0177451 A1 | 7/2008 | Saitou et al. | |
| 2009/0012690 A1 | 1/2009 | Trotter et al. | |
| 2009/0018732 A1 | 1/2009 | Choby et al. | |

FOREIGN PATENT DOCUMENTS

| | | |
|---|---|---|
| EP | 856446 | 11/2001 |
| EP | 2082933 | 7/2009 |

* cited by examiner

*Primary Examiner* — Michael J. Zanelli
(74) *Attorney, Agent, or Firm* — Jeff A. Ruppel; Jeff A. Greene (57) ABSTRACT

A method for automatically controlling the downhill speed of a machine. The method includes establishing a target machine speed based on a current machine speed and determining whether at least one trigger condition including a grade greater than a predetermined threshold has been satisfied. If satisfied, the method activates a control system to control at least one of a powertrain retarder and a change in a transmission gear to prevent exceeding the target machine speed.

19 Claims, 9 Drawing Sheets

```
┌──────────────────┐      ┌──────────────────────┐
│  CONTROL SYSTEM 100 │─ ─ ▶│ CONTROL SYSTEM 100   │
│  REQUESTS GEAR      │     │ DOES NOT CHANGE      │
│  CHANGE             │     │ BRAKING LEVEL DURING │
│                     │     │ TRANSMISSION 38 SHIFT│
└──────────────────┘      └──────────────────────┘
       902                          904
                                              900
```

| Gears Grade 22 | Load 32 (Kg) | | | | |
|---|---|---|---|---|---|
| | 0 | 8000 | 16000 | 25000 | 32000 |
| 0% | 7 | 7 | 7 | 7 | 7 |
| 5% | 7 | 7 | 7 | 7 | 7 |
| 6% | 7 | 7 | 7 | 6 | 6 |
| 7% | 7 | 7 | 6 | 6 | 6 |
| 8% | 7 | 6 | 6 | 5 | 5 |
| 9% | 7 | 6 | 5 | 5 | 5 |
| 10% | 6 | 6 | 5 | 5 | 5 |
| 12% | 6 | 5 | 5 | 4 | 4 |
| 14% | 5 | 5 | 4 | 4 | 4 |
| 16% | 5 | 4 | 4 | 3 | 3 |
| 18% | 4 | 4 | 3 | 3 | 3 |
| 20% | 4 | 3 | 3 | 2 | 2 |
| 22% | 4 | 3 | 3 | 2 | 2 |
| 24% | 3 | 3 | 2 | 2 | 2 |
| 26% | 3 | 3 | 2 | 2 | 2 |
| 29% | 3 | 2 | 2 | 1 | 1 |
| 31% | 3 | 2 | 2 | 1 | 1 |
| 34% | 2 | 2 | 1 | 1 | 1 |
| 36% | 2 | 2 | 1 | 1 | 1 |
| 39% | 2 | 1 | 1 | 1 | 1 |
| 41% | 2 | 1 | 1 | 1 | 1 |
| 44% | 2 | 1 | 1 | 1 | 1 |
| 46% | 2 | 1 | 1 | 1 | 1 |
| 48% | 1 | 1 | 1 | 1 | 1 |

FIG. 16

AUTOMATIC DOWNHILL SPEED CONTROL SYSTEM

TECHNICAL FIELD

The present disclosure relates to automatic downhill speed control, and more particularly to automatic powertrain retarding and gear shifting to control downhill speed.

BACKGROUND

Machine operators often apply retarding devices and select gearing to control speed during downhill conditions. US Patent Application Publication 2008/0207398 (the '398 publn) discloses the use of an orientation sensor to control the retarding of an engine through operation of a hydraulic driven fan. The '398 publn, however, fails to disclose a system to determine a target speed. The '398 publn also fails to disclose a system to control a downhill speed through powertrain retarding and transmission gear control.

SUMMARY

In one aspect, the present disclosure provides a method for automatically controlling a downhill speed of a machine. The method establishes a target machine speed based on a current machine speed and determines whether at least one trigger condition including a grade greater than a predetermined threshold has been satisfied. If satisfied, the method activates a control system to control a powertrain retarder to prevent exceeding the target machine speed.

In another aspect the method increases the level of powertrain retarding to decrease the machine speed below the target speed when a brake pedal is engaged.

In yet another aspect, a machine is provided including a throttle, an engine, a powertrain retarder, a grade sensor, and a controller. The controller is in electrical communication with the powertrain retarder and grade sensor and is configured to activate the powertrain retarder to prevent exceeding a target machine speed when the grade sensor measures a grade of the machine greater than a predetermined threshold and the throttle is released.

Other features and aspects of this disclosure will be apparent from the following description and the accompanying drawings.

DETAILED DESCRIPTION

Figure 1:
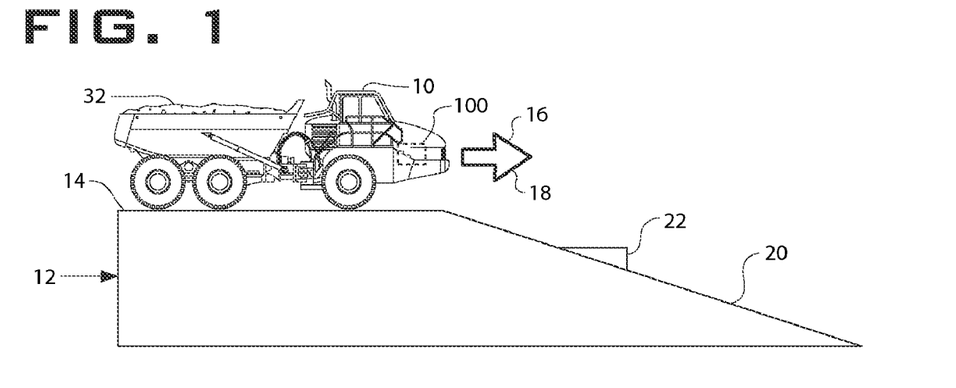
FIG. 1 is a diagrammatic view of a machine on a flat upper surface.
Figure 2:
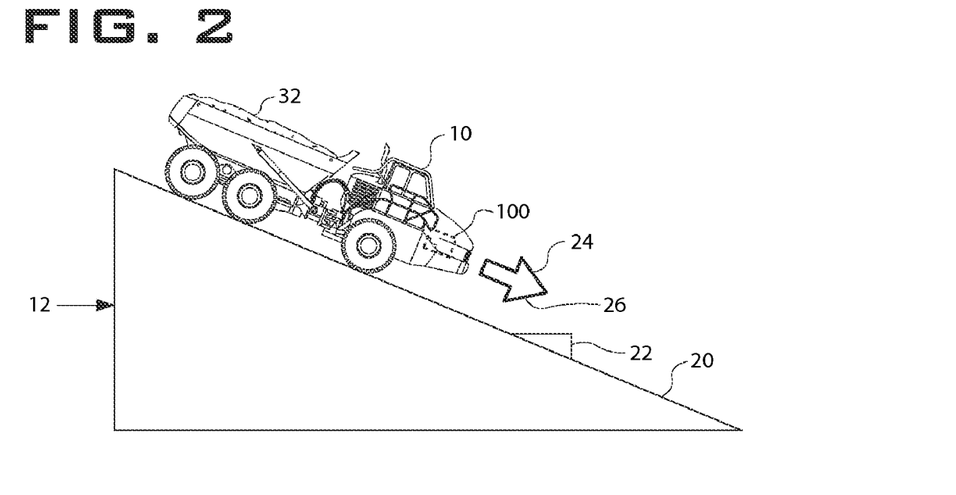
FIG. 2 is a diagrammatic view of a machine on a downhill surface.
Figure 3:
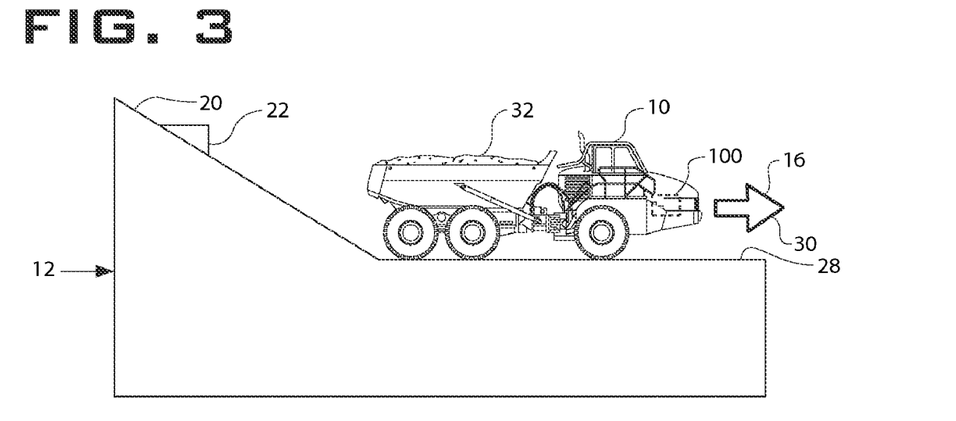
FIG. 3 is a diagrammatic view of a machine on a flat lower surface.

FIGS. 1-3 show a machine 10 equipped with an automatic downhill speed control system 100 (the "control system 100") on a terrain 12. FIG. 1 shows the machine 10 on a flat upper surface 14 of the terrain 12 with the machine 10 traveling in a flat direction 16 at a upper flat speed 18. FIG. 2 shows the machine on a downhill surface 20 having a grade 22 of the terrain 12 with the machine 10 traveling in a downhill direction 24 at a downhill speed 26. FIG. 3 shows the machine 10 on a flat lower surface 28 of the terrain 12 with the machine 10 returning to a flat direction 16 at a lower flat speed 30.

The machine 10 may embody an articulated truck (as shown) or any other of a wide range of vehicles or moving machines. The machine 10 may include, for example: trucks, cars, on-highway trucks, dump trucks, off-highway trucks, earth moving machines, wheel loaders, compactors, excavators, track type tractors, dozers, motor graders, wheel tractor-scrapers, or any other moving machine. Machine 10 may or may not be carrying a load 32.

Figure 4:
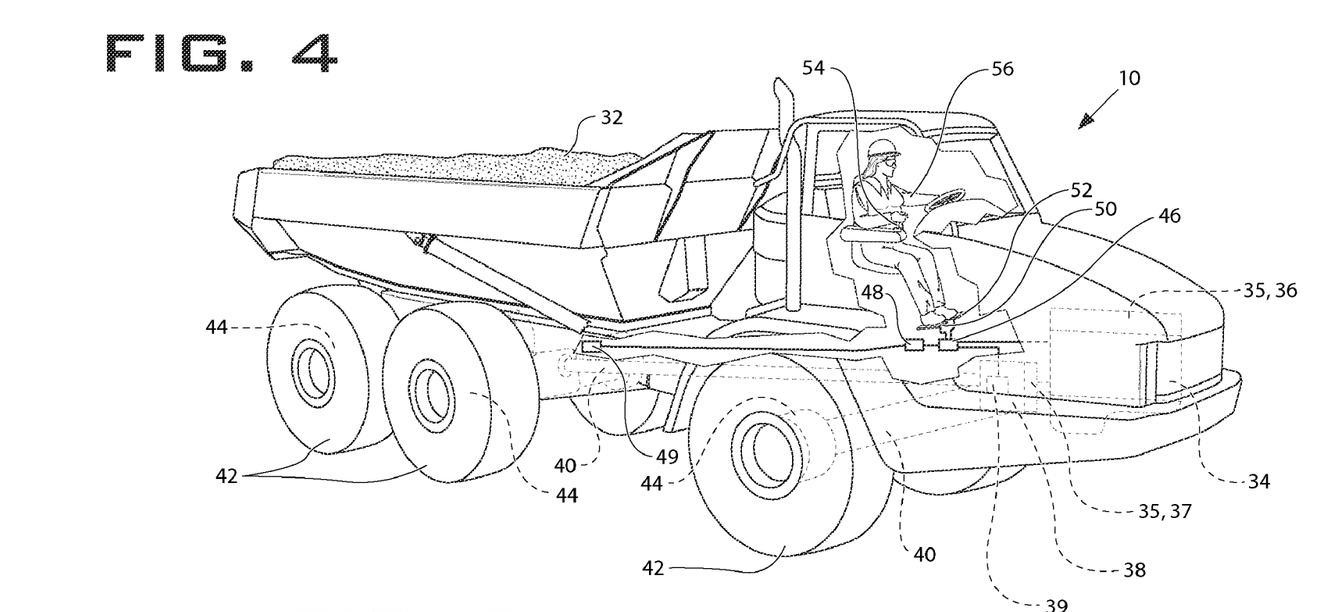
FIG. 4 is a diagrammatic view of a machine.

FIG. 4 shows the machine 10 includes an engine 34, powertrain retarder 35, transmission 38, automatic transmission control 39, driveshafts 40, wheels 42, machine or wheel brakes 44, controller 46, grade sensor 48, load sensor 49, throttle 50, brake pedal 52, and retarder lever 54. The engine 34 delivers power to the wheels 42 through the transmission 38 and driveshafts 40. The throttle 50, brake pedal 52, and retarder lever 54 are controlled by an operator 56. The operator 56 may embody a driver (as shown) or an autonomous control system.

The powertrain retarder 35 includes devices or systems used to dissipate energy in systems powering or transmitting power to propel the machine 10. The powertrain retarder 35 may include an engine brake 36 and/or a transmission retarder 37. The powertrain retarder 35 may include either of the engine brake 36 or transmission retarder 37, or both. The engine brake 36, transmission retarder 37, and any other included powertrain retarder 35 may be used together and may compliment one another.

The engine brake 36 is a device that retards or slows the engine 34 and machine 10 by dissipating energy. The engine brake 36, also known as a compression brake or Jake brake, works by actuating, opening, or controlling the engine's 34 valves. The engine brake 36 may open or actuate an exhaust valve of the engine 34 near top dead center of the compression stroke, thereby releasing compressed air into the exhaust to dissipate energy and slow the machine 10.

The transmission retarder 37, or another driveline retarder, dissipates energy in the driveline. The transmission retarder 37 may operate one or more hydraulic pumps attached to the transmission 38 to dissipate energy. The transmission retarder 37 may transfer fluid (hydraulic, transmission, or another available fluid) into a chamber spinning with the transmission 38. The chamber may include vanes or other structures. When the fluid is added to the chamber viscous drag is applied to the transmission 38 which dissipates energy and slows the machine 10. The transmission retarder 37 may also operate an electric motor, heater, or generator connected to the transmission 38 or driveshafts 40 to dissipate energy.

The powertrain retarder 35 may also include other retarders known in the art. For instance, the powertrain retarder 35 may include an exhaust brake that adds a controllable restriction in the exhaust system or an electric retarder that may use electromagnetic induction to apply a retarding force to the flywheel, transmission 37, or driveshafts 40. Energy from the powertrain retarder 35 may be used by other systems or stored for powertrain use later.

The controller 46 communicates with and controls the engine 34, powertrain retarder 35, and transmission 38. The controller 46 also receives data from the grade sensor 48, throttle 50, brake pedal 52, and retarder lever 54. The controller 46 embodies an electronic control module or another processor known in the art capable of communicating, receiving, processing, and storing data. The controller 46 may also communicate, receive, and process more data with more systems than is described here.

The automatic transmission control 39 automatically determines (as described in relation to FIGS. 9 and 15 below) and engages the appropriate transmission 38 gear. The transmission 38 gear may also be manually selected by the operator 56.

The grade sensor 48 provides an indication of the grade 22 the machine 10 is on. The grade sensor 48 may embody an accelerometer (as described in relation to FIG. 16 below), an inclinometer, or another sensor known in the art for determining incline, decline, change in elevation, slope, orientation, or grade 22 of the machine 10. The grade sensor 48 may also embody a global positioning system, an external input regarding grade at the machine's 10 current position, or an input from the operator 56. The grade 22 may be measured as a percentage (%) grade of rise divided by run, with 0% grade being a flat slope of zero and a 100% grade being a steep slope of 1 foot rise over 1 foot run (1/1), or a 45 degree slope.

The load sensor 49 provides an indication of the weight of the load 32 and machine 10. The load sensor 49 may monitor aspects of the machine's 10 suspension or embody a load cell. The load sensor 49 may also embody an external input representing weight or another device or method known in the art for determining the weight of the load 32 and machine 10. In embodiments containing fewer features the load sensor 49 may not be needed.

The throttle 50 is depressed by the operator 56 to increase fuel to the engine 34 and increase the speed of the machine 10. The brake pedal 52 is used by the operator 56 to apply the wheel brakes 44 and slow the machine 10.

Figure 5:
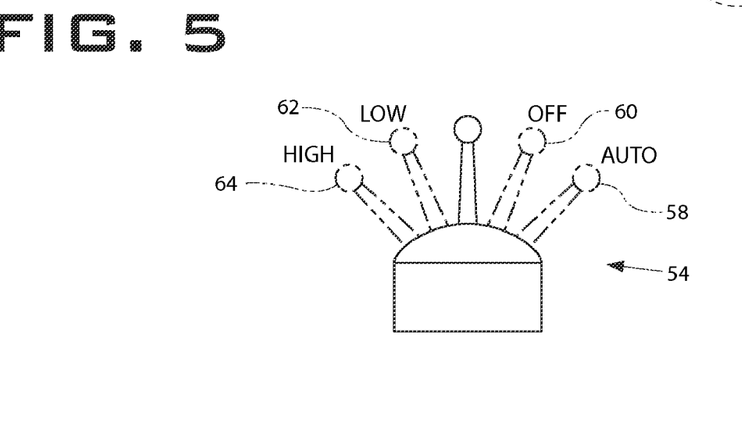
FIG. 5 is a diagrammatic view of a retarder lever.

The retarder lever 54 is used by the operator 56 to apply the powertrain retarder 35 and slow the machine 10. As seen in FIG. 5, the retarder lever 54 may have multiple positions or modes of operation. For example, the retarder lever 54 may have an automatic position 58, off position 60, low position 62, and a high position 64. While in the automatic position 58, the control system 100 is activated. While in the off position 60 the control system 100 and powertrain retarders 35 are inactive. While in the low position 62 the control system 100 is inactive and the powertrain retarder 35 is applied. While in the high position 64 the control system 100 is inactive and the powertrain retarder 35 is applied to a greater degree than while in the low position 62. The retarder lever 54 may have more or fewer positions and may also be eliminated with the automatic position 58 being selected by default.

Figure 6:
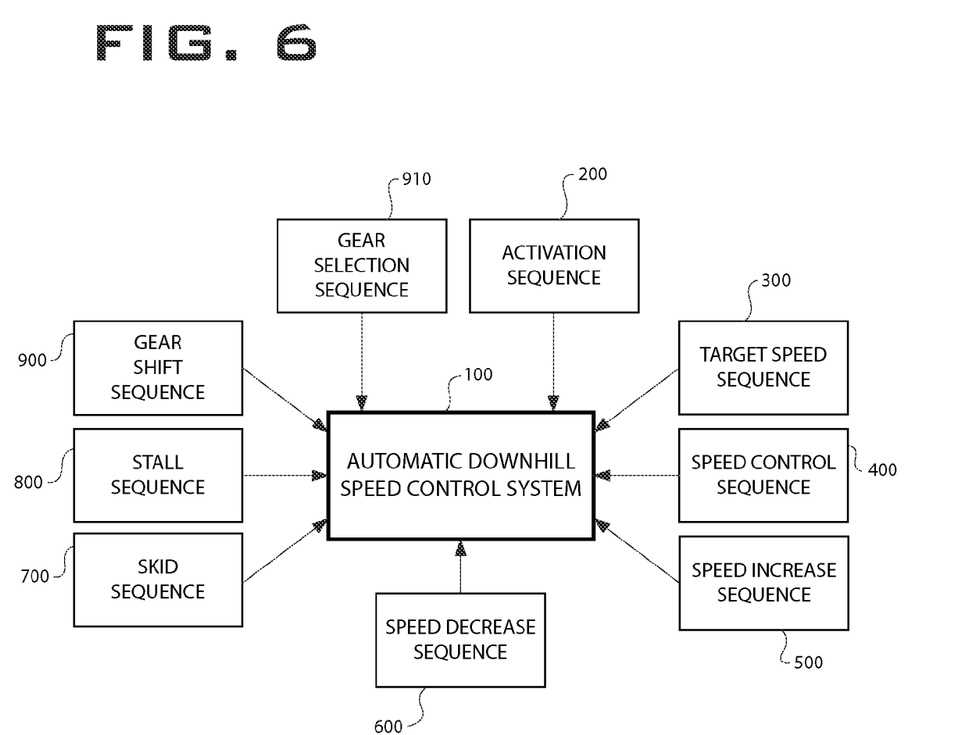
FIG. 6 is a block diagram of a automatic downhill speed control system.

The controller 46 is configured to operate the control system 100. The control system 100 is graphically shown in FIG. 6 to include the following control sequences: an activation sequence 200, a target speed sequence 300, a speed control sequence 400, a speed increase sequence 500, a speed decrease sequence 600, a skid sequence 700, a stall sequence 800, shift sequence 900, and gear selection sequence 910. The control system 100 may include additional or fewer sequences.

Figure 7:
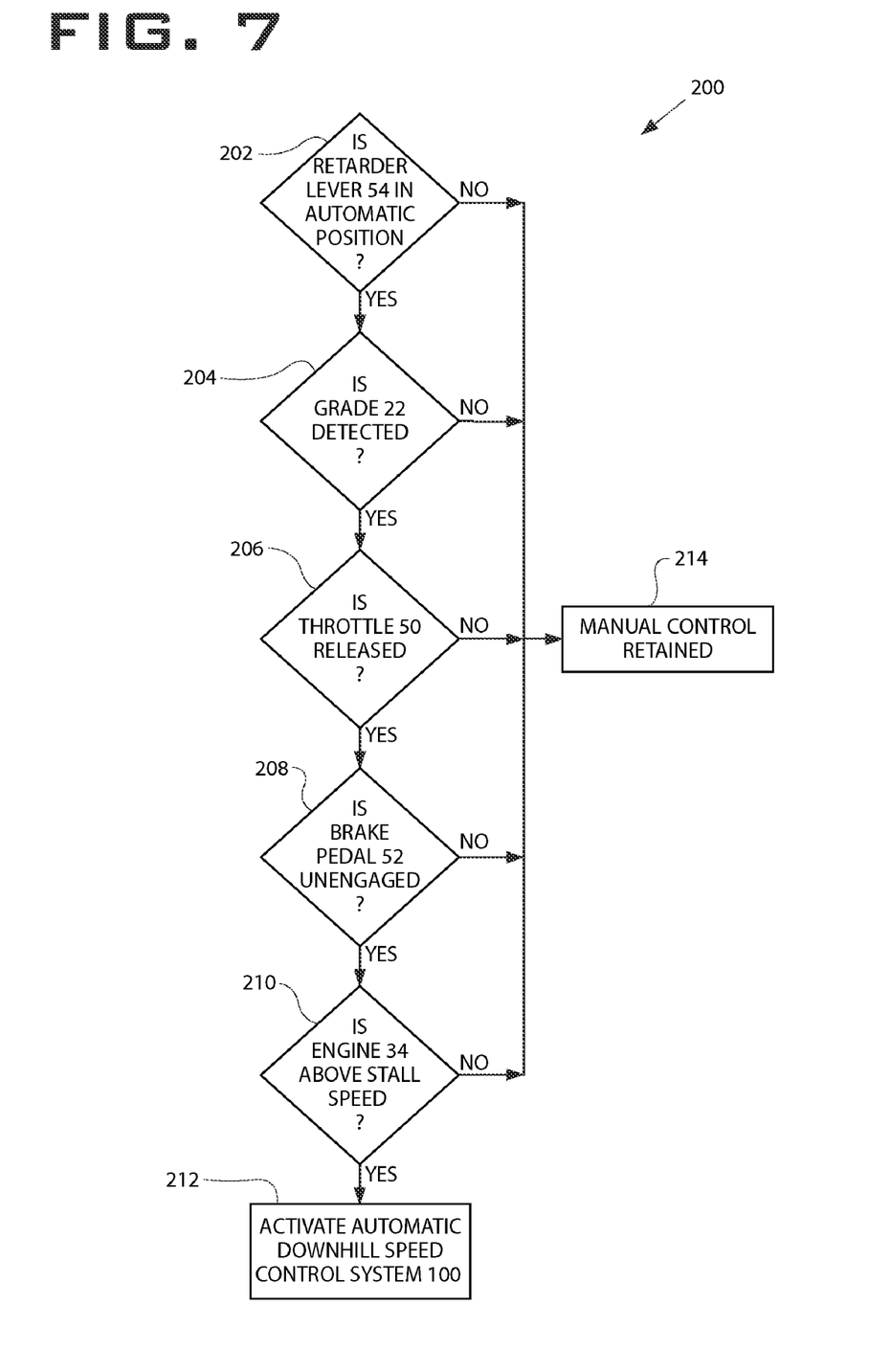
FIG. 7 is a block diagram of a activation sequence.

The activation sequence 200, shown in FIG. 7, determines when the control system 100 is activated and the powertrain retarder 35 will be automatically operated. The activation sequence 200 asks at least one trigger condition to determine whether at least one trigger condition is satisfied to activate the control system 100.

As illustrated in FIG. 7, the activation sequence 200 may include 5 trigger conditions. In trigger condition 202, the activation sequence 200 checks to see whether the retarder lever 54 is in the automatic position 58. In trigger condition 204, the activation sequence 200 checks to see whether a downhill grade 22 beyond a predetermined grade threshold has been reported by the grade sensor 48. The predetermined grade threshold may be that grade 22 where powertrain retarding would be needed to control machine downhill speed 26 and may be between a 0% and 4% grade 22.

In trigger condition 206 the activation sequence 200 checks to see whether the throttle 50 has been released. In trigger condition 208 the activation sequence 200 checks to see whether the brake pedal 52 is not engaged. In trigger condition 210 the activation sequence 200 checks to see whether the engine 34 is above a predetermined stall speed. The predetermined stall speed is the speed below which the engine 34 does not perform properly and may represent a speed below which not enough fuel and air are delivered to the engine 34 to keep it running. If below the predetermined stall speed, then the engine speed may be automatically increased to above the stall speed.

If the answer to each of these trigger conditions 202, 204, 206, 208, and 210 in the activation sequence 200 is "yes," then the control system 100 is activated in outcome 212. If the answer to any of these trigger conditions 202, 204, 206, 208, and 210 in the activation sequence 200 is "no," then the control system 100 is not activated and manual control is retained in outcome 214. The activation sequence 200 may include additional or fewer trigger conditions, questions, answers, and outcomes.

Once activated by the activation sequence 200, the control system 100 employs additional sequences to control the machine 10 and engine 34, as seen in FIGS. 8-15.

Figure 8:
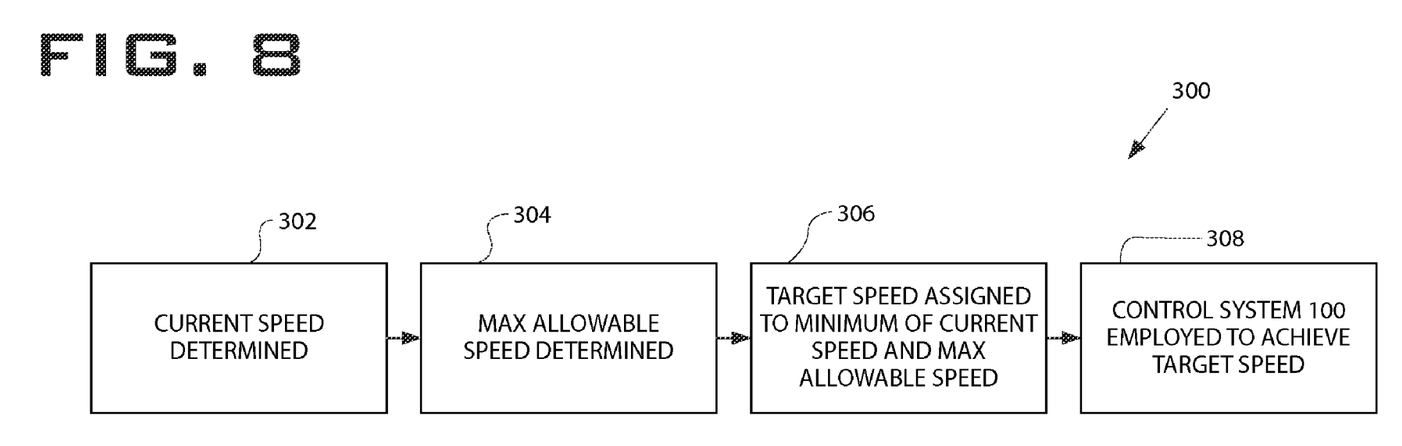
FIG. 8 is a block diagram of a target speed sequence.

FIG. 8 illustrates the target speed sequence 300, which is used to determine the target speed for the control system 100. In step 302, the current speed of the machine 10 is automatically determined or established. In step 304, the maximum allowable speed for the machine 10 is determined. The maximum allowable speed is the predetermined speed at which the machine 10 should be operated for the conditions. The maximum allowable speed for the machine 10 may be a function of grade 22 and weight of the load 32. The steeper the grade 22 and the higher the weight of the load 32, the lower the maximum allowable speed may be. The maximum allowable speed may be determined by the controller 46 via a calculation or map. The maximum allowable speed for the machine 10 may also be a function of additional factors; such as wheel slip, load distribution, implement status, engine condition, or another factor that may impact machine 10 operation. Step 304 is constantly repeating to account for changing conditions, such as changes in grade 22, that would change the maximum allowable speed.

In step 306, the target speed is assigned to the lower of the current speed determined in step 302 and the maximum allowable speed determined in step 304. Step 306 is constantly repeating to account for changing maximum allowable speeds. In step 308, the control system 100 is employed to achieve the target speed determined in step 306.

Figure 9:
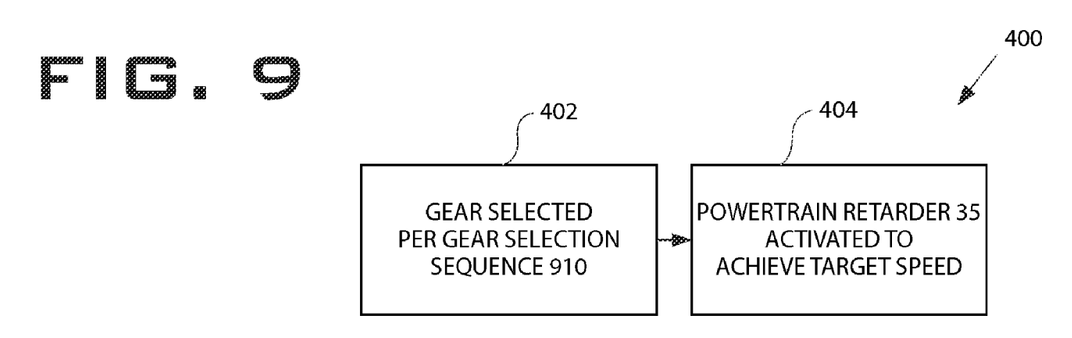
FIG. 9 is a block diagram of a speed control sequence.

FIG. 9 illustrates the speed control sequence 400, which is used to achieve the target speed. The control system 100 attempts to make the downhill speed 26 match the target speed as follows. In step 402, the proper transmission 38 gear is selected according to the gear selection sequence 910 (as described in relation to FIG. 15 below). Next, in step 404, the powertrain retarder 35 is activated to achieve the target speed. If the speed is above the target speed, then the degree or level of powertrain retarding is increased and if the speed is below the target speed, then the level of engine braking is decreased.

Figure 10:
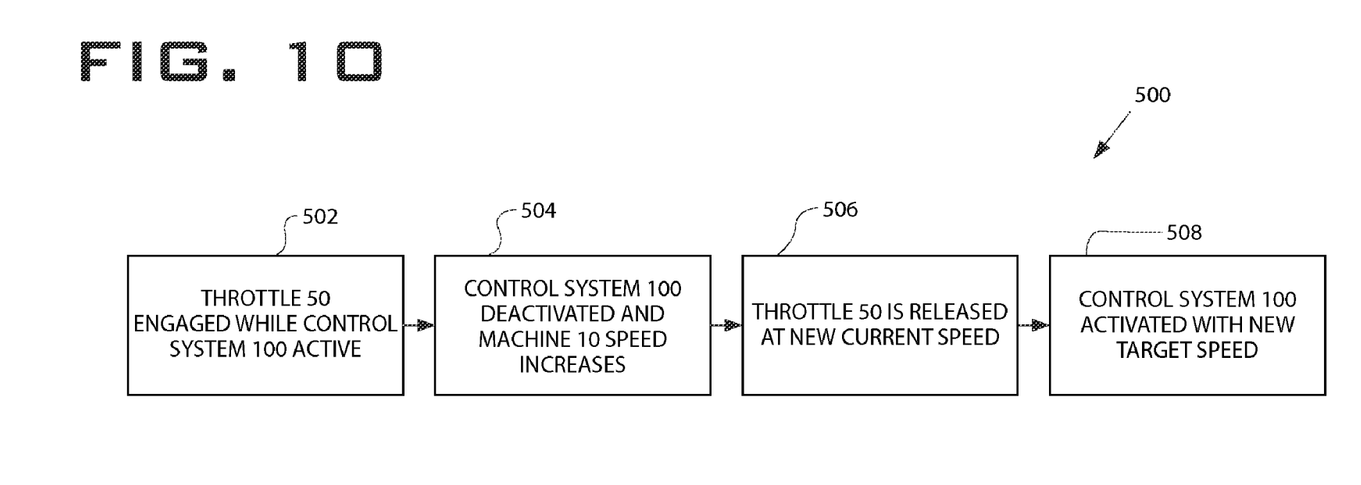
FIG. 10 is a block diagram of a speed increase sequence.

FIG. 10 illustrates the speed increase sequence 500, which is used to increase the speed of the machine 10 while on the grade 22 and the control system 100 is active. In step 502, the throttle 50 is engaged while the control system 100 is active. In step 504, the control system 100 is deactivated and the machine 10 speed increases in response to the engagement of the throttle 50. In step 506 the throttle 50 is again released at a new current speed. In step 508, the control system 100 is reactivated with a new target speed being assigned by the target speed sequence 300 based on the new current speed from step 506.

Figure 11:
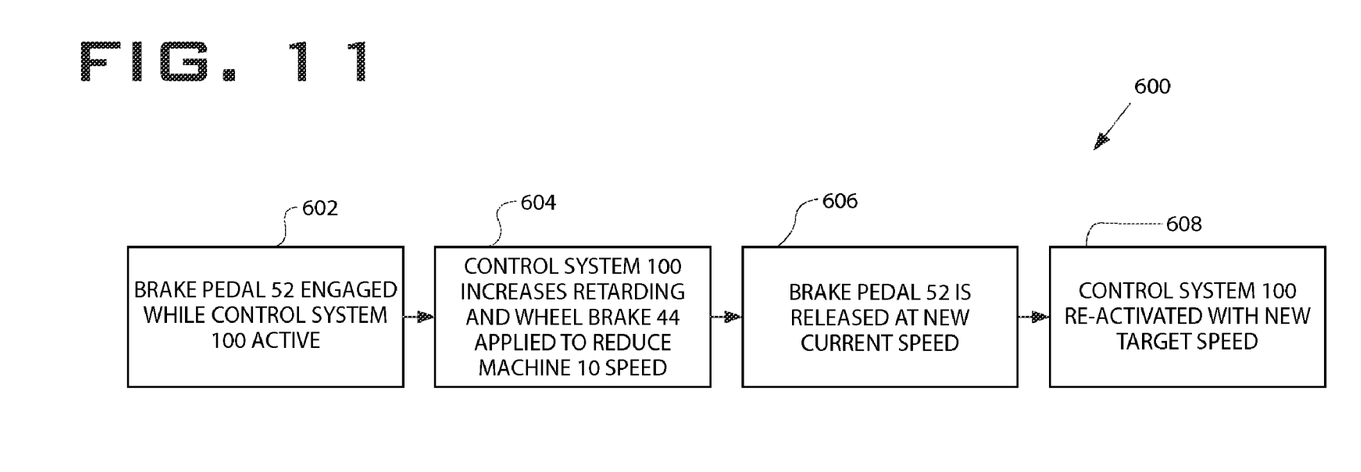
FIG. 11 is a block diagram of a speed decrease sequence.

FIG. 11 illustrates the speed decrease sequence 600, which is used to decrease the speed of the machine 10 while on the grade 22 and the control system 100 is active. In step 602, the brake pedal 52 is engaged while the control system 100 is active. In step 604, the control system 100 automatically increases the level of powertrain retarding and the wheel brake 44 is applied as needed to reduce the speed of the machine 10. In step 606 the brake pedal 52 is released at a new current speed. In step 608, the control system 100 is reactivated with a new target speed being assigned by the target speed sequence 300 based on the new current speed from step 606.

Figure 12:
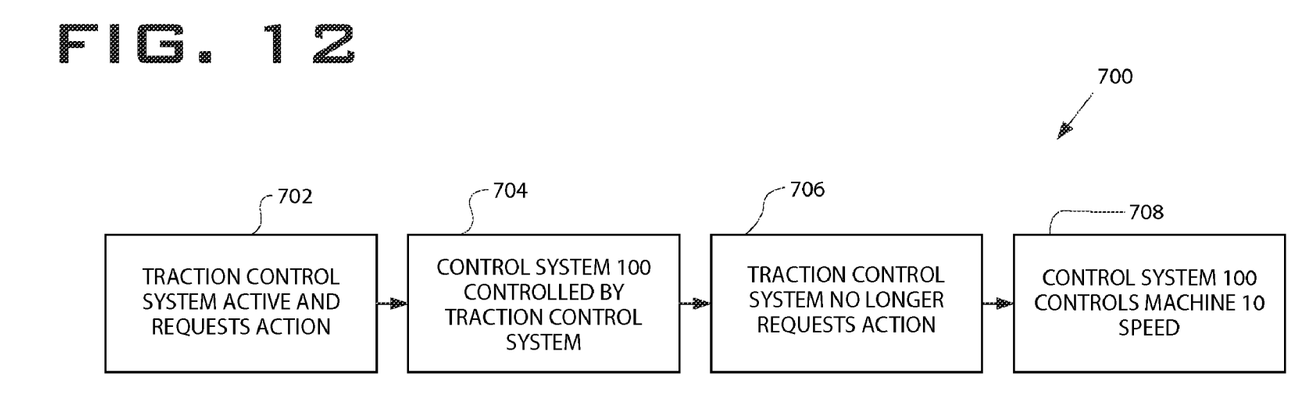
FIG. 12 is a block diagram of a skid sequence.

FIG. 12 illustrates the skid sequence 700, which is used to assist during a skid event when a traction control system is active. Skid events occur when the machine 10 begins to slip on the terrain 12 or traction is otherwise lost. The traction control system may be activated based on a variety of inputs, including wheel speed changes and accelerometer data. Depending on the conditions, the traction control system may take a number of corrective actions, including changing power distribution to the wheels 42, applying wheel brakes 44, applying the powertrain retarder 35, and changing transmission 38 gears.

In step 702 the traction control system is active and requests action. In step 704, the control system 100 is controlled by the traction control system and applies the level of powertrain retarding or changes the transmission 38 gears as requested by the traction control system. In step 706, the skid event is over and the traction control system is no longer active or requesting corrective action. In step 708, the control system 100 is reactivated with the target speed from before the traction control system was activated.

Figure 13:
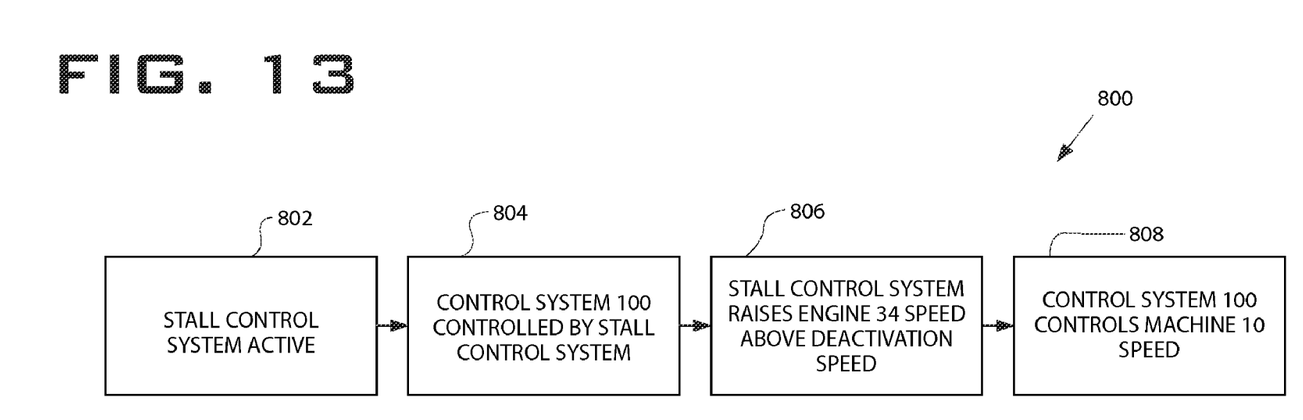
FIG. 13 is a block diagram of a stall sequence.

FIG. 13 illustrates the stall sequence 800, which like trigger condition 210 is used to prevent the engine 34 speed from falling below the predetermined stall speed. In step 802 a stall control system is activated when the engine 34 speed falls below the predetermined stall speed. In step 804, the control system 100 is controlled by the stall control system. In step 806, the stall control system raises the engine 34 speed to above a deactivation speed, which may be higher than the predetermined stall speed to help prevent the engine 34 speed from again falling below predetermined stall speed. In step 808, once the engine 34 speed is above the deactivation speed, the stall control system is deactivated and the control system 100 is activated with the target speed from before the stall control system was activated.

Figure 14:
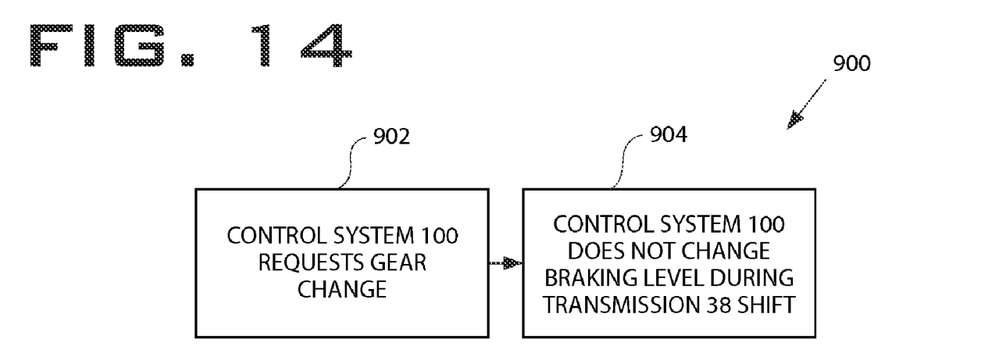
FIG. 14 is a block diagram of a shift sequence.

FIG. 14 illustrates the shift sequence 900, which helps provide smooth shifts of the transmission 38. In step 902, either the control system 100 or automatic transmission control 39 requests a transmission 38 gear shift. In step 904, the control system 100 refrains from changing the powertrain retarding level until after the transmission 38 gear shift is complete.

Figure 15:
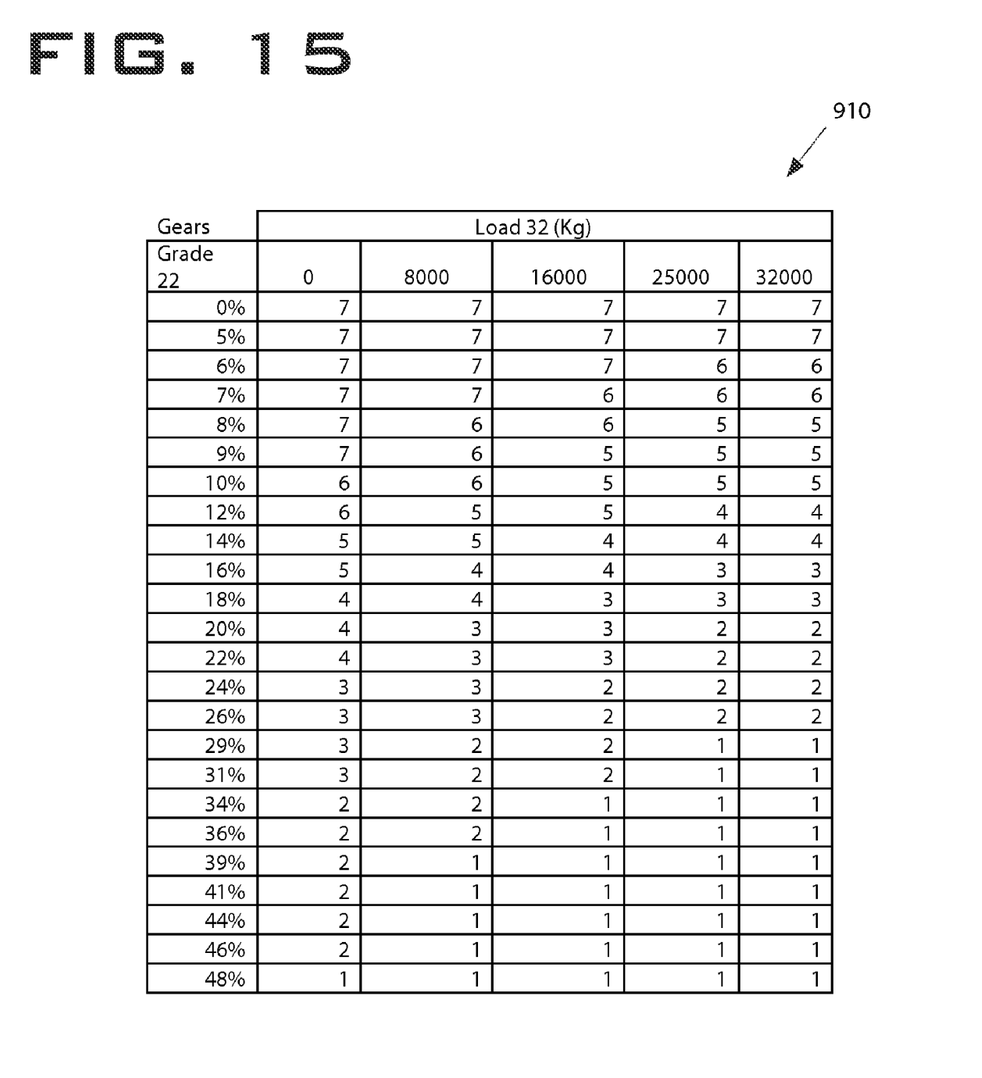
FIG. 15 is a chart illustrating a gear selection sequence.

FIG. 15 is an exemplary chart to illustrate how the gear selection sequence 910 works. As included in step 402 of the speed control sequence 400, the control system, through the automatic transmission control 39, selects the proper gear for the conditions. As seen in FIG. 15, this gear selection may be based on grade 22 and load 32 weight, and not the target speed. FIG. 15 shows an exemplary chart of the proper gear (1-7) as a function of grade 22 versus load 32 weight. Higher transmission 38 gears are selected for lower grades 22 and lower load 32 weights. Actual values will vary greatly depending on the machine 10 characteristics. Additional variables may also be used for this gear selection.

In other embodiments, one or more of the sequences 200, 300, 400, 500, 600, 700, 800, 900, or 910 may not be included. For instance, the speed increase sequence 500, speed decrease sequence 600, skid sequence 700, stall sequence 800, shift sequence 900, and/or gear selection sequence 910 may be eliminated. In one embodiment, the automatic transmission control 39 may be eliminated, which may eliminate the need for the load sensor 48, step 402 of the speed control sequence 400, gear shift sequence 900, and gear selection sequence 910.

Figure 16:
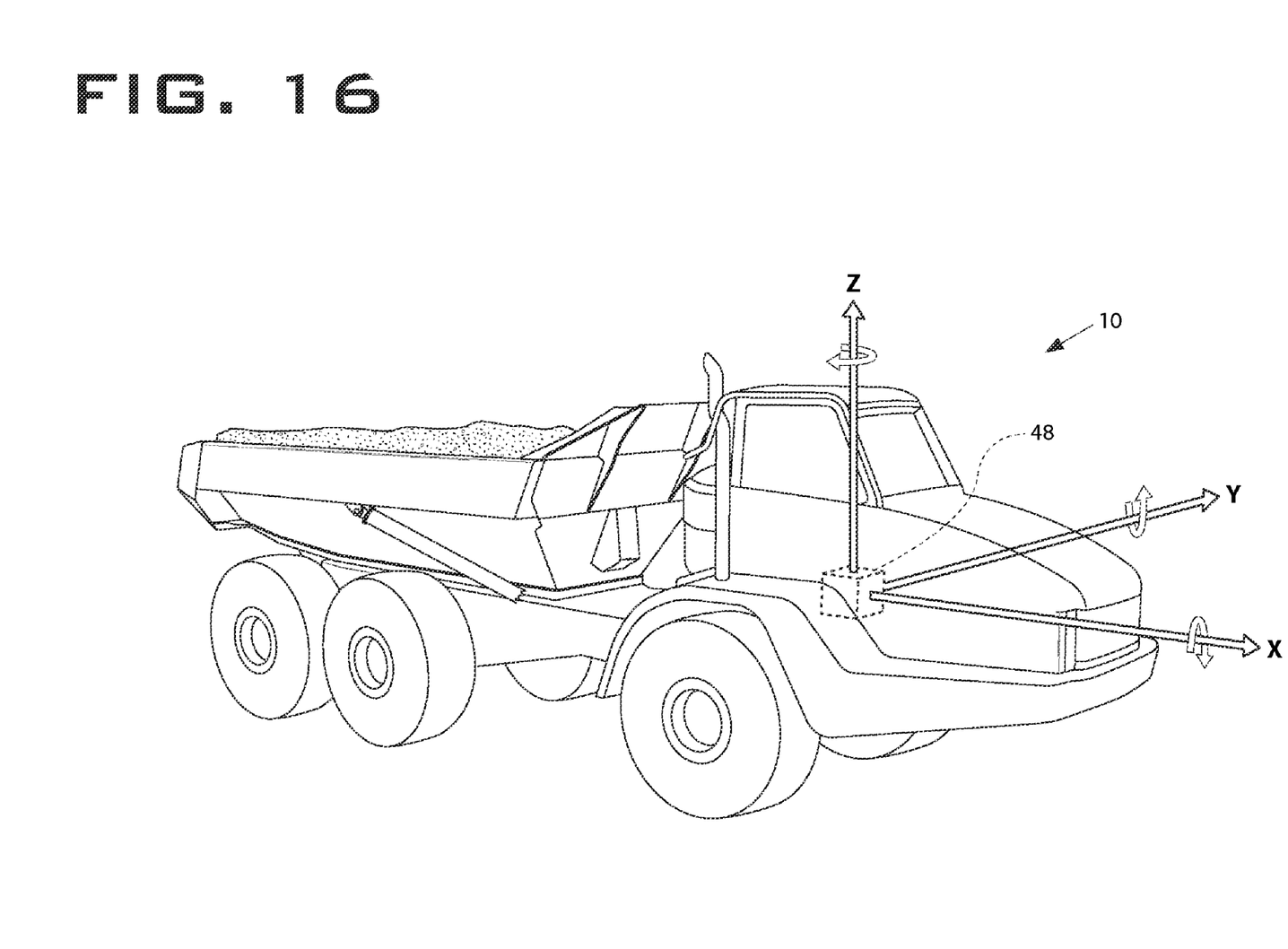
FIG. 16 is a diagrammatic view of a grade sensor.

FIG. 16 illustrates an exemplary grade sensor 48 that may be used. This grade sensor 48 embodies a three-axis accelerometer, with a roll axis X, a pitch axis Y, and a yaw axis Z. Readings from these three axes X, Y, and Z can be used to provide an indication of grade 22 through trigonometry calculations. These calculations must account for a number of variables, including irregularities in the data and false readings from rough terrain 12, machine 10 sway during turns, machine 10 rock during speed changes or when the wheel brakes 44 are applied, wheel 42 bounce, load 32 shifts, transmission 38 gear shifts, machine 10 suspension compression, rapidly changing grades 22, and more.

INDUSTRIAL APPLICABILITY

The control system 100 described above provides the operator 56 with control over the machine's 10 speed. As the operator 56 begins down the grade 22 (see FIG. 1) and releases the throttle 50, the control system 100 takes over to maintain the current speed of the machine 10. If the current speed is too fast for the grade 22 and load 32 weight then the target speed sequence 300 reduces the machine 10 speed. If the operator 56 wishes to increase the machine 10 speed by depressing the throttle 50 then the speed increase sequence 500 increases the machine 10 speed. If the operator 56 wishes to decrease the machine 10 speed by depressing the brake pedal 52 then the speed decrease sequence 600 reduces the machine 10 speed.

If a skid occurs and the traction control system needs to change the powertrain retarding level or transmission 38 gear, then the skid sequence 700 provides the control to the traction control system. If the engine 34 speed falls below a predetermined stall speed then the stall sequence 800 provides control to the stall control system. While a transmission 38 gear change is occurring, the control system 100 does not change the powertrain retarding level until after the gear change is complete.

The control system 100 is continually adapting to the current conditions. Changes in grade 22 will cause changes to the maximum allowable speed in the target speed sequence 300 and will possibly automatically change the gear selected per the gear selection sequence 910. Once the machine 10 returns to the flat surface 28 (see FIG. 3) the grade 22 sensed will be less than the predetermined threshold in the activation sequence 200 and the control system 100 will be deactivated.

During downhill conditions, the control system 100 helps an operator 56 maintain a desired speed without significant input and without employing the wheel brakes 44 via brake pedal 52 to achieve the desired speed. Wheel brakes 44 overheat and wear and may not be effective in controlling speed in downhill conditions, especially with large machines 10, heavy loads 32, and steep grades 22. Powertrain retarders 35, such as engine brakes 36, are generally preferred over wheel brakes 44 in these conditions and applications.

Without control system 100, an operator 56 needs to continually toggle retarder lever 54 to achieve and maintain the required level of powertrain retarding for the desired machine 10 in downhill conditions. This continual action required by the operator 56 may cause her to apply the wheel brakes 44 to make needed corrections. The control system 100 may reduce this duty on the operator 56 and help prevent the use of the wheel brakes 44. This reduced duty on the operator 56 may allow her to give more focus on the road and other duties. The control system 100 may also make automated control of the machine 10 easier.

The control system 100 also corrects for changes in grade 22 before they may be noticed and corrected for by an operator 56. The target speed sequence 300 helps prevent exceeding a maximum allowable speed for the conditions. The skid sequence 700 helps the machine 10 automatically react to adverse conditions while allowing the operator 56 to remain focused on steering. The stall sequence 800 helps the machine 10 automatically react to low speed conditions that may not be noticed or reacted to in time by the operator 56. The gear shift sequence 900 helps provide smooth transmission 38 shifting and may reduce transmission 38 wear. The gear selection sequence 910 assists the operator 56 by automatically engaging the transmission 38 in the proper gear for the conditions. The three-axis accelerometer may provide a low cost alternative to an inclinometer as a grade sensor 48.

Despite the high level of automatic control, the control system 100 still provides operators 56 a great deal of input. The activation sequence 200 provides an easy method of activation of the control system 100. The operator simply needs to put the retarder lever 54 in the automatic position 58 and take her foot off the throttle 50 when approaching a grade 22.

The target speed sequence 300 allows the operator 56 to quickly establish her desired downhill speed 26. The speed increase sequence 500 allows the operator 56 to easily increase the speed of the machine 10. The speed decrease sequence 600 allows the operator 56 to easily decrease the speed of the machine 10 while further decreasing the need for the wheel brakes 44.

In summary, a method is disclosed for automatically controlling the downhill speed of a machine is provided comprising: establishing a target machine speed based on a current machine speed; determining whether at least one trigger condition including a grade measured by a grade sensor is greater than a predetermined threshold has been satisfied; and controlling a powertrain retarder to prevent exceeding the target machine speed upon determining the at least one trigger condition has been satisfied. The at least one trigger condition may also include at least one or more of: a automatic mode selected by an operator, a throttle being released, a machine brake not engaged, and an engine speed sufficient to prevent stall. The grade sensor may be an accelerometer. A transmission gear may be selected based on the grade and a weight of a load carried by the machine. The method may also include: determining a maximum allowable machine speed; and increasing a level of powertrain retarding to prevent exceeding the maximum allowable machine speed when the maximum allowable machine speed is lower then the target machine speed. The maximum allowable machine speed may be a function of the grade and a weight of a load carried by the machine. The powertrain retarder may be deactivated when the throttle is engaged. The powertrain retarder may be reactivated and a new target speed set based on a new current speed when the throttle is again released. A level of powertrain retarding may be increased to decrease machine speed below the target speed when a brake pedal is engaged and a new target speed may be set based on a new current speed when the brake pedal is released. The powertrain retarder may be deactivated when the grade is below the predetermined threshold. A current level of powertrain retarding may be maintained when a change in a transmission gear is occurring. The powertrain retarder may also include at least one of an engine brake and a transmission retarder.

A method is also disclosed for automatic speed control of a machine comprising: establishing a target machine speed based on a current machine speed; determining whether a trigger condition has been satisfied; activating a level of powertrain retarding to prevent exceeding the target machine speed upon determining the trigger condition has been satisfied; and increasing the level of powertrain retarding to decrease machine speed below the target speed when a brake pedal is engaged. The at least one trigger condition may also include at least one or more of: a grade greater than a predetermined threshold, a automatic mode selected by an operator, a throttle being released, a machine brake not engaged, and an engine speed sufficient to prevent stall. The method may also include changing a transmission gear based on a grade and a weight of a load carried by the machine. The method may also include: determining a maximum allowable machine speed; and increasing the level of powertrain retarding to prevent exceeding the maximum allowable machine speed when the maximum allowable machine speed is lower than the target machine speed, wherein the maximum allowable machine speed may be a function of a grade and a weight of a load carried by the machine. The method may also include activating a level of powertrain retarding to prevent exceeding a new target machine speed based on a new current speed when the brake pedal is released.

Also disclosed is a machine comprising: a throttle; an engine; a powertrain retarder; a grade sensor; and a controller in electrical communication with the powertrain retarder and the grade sensor, wherein the controller activates the powertrain retarder to prevent exceeding a target machine speed when the grade sensor reports a grade of the machine is greater than a predetermined threshold and the throttle is released. The machine may also include a transmission that changes gears based on the grade and a weight of a load carried by the machine when the grade of the machine is greater than a predetermined threshold and the throttle is released. The grade sensor may be a three-axis accelerometer.

Aspects of this disclosure may also be applied to other engine 34 and machine 10 systems in need of downhill speed control. These other engine 34 and machine 10 systems may include hybrid, electric, hydraulic, and others. Although the embodiments of this disclosure as described herein may be incorporated without departing from the scope of the following claims, it will be apparent to those skilled in the art that various modifications and variations can be made. Other embodiments will be apparent to those skilled in the art from consideration of the specification and practice of the disclosure. It is intended that the specification and examples be considered as exemplary only, with a true scope being indicated by the following claims and their equivalents.

What is claimed is:

1. A method for automatically controlling the downhill speed of a machine comprising:
    establishing a target machine speed based on a current machine speed;
    determining a maximum allowable machine speed;
    determining whether at least one trigger condition including a grade measured by a grade sensor is greater than a predetermined threshold has been satisfied; and
    controlling a powertrain retarder to prevent exceeding the maximum allowable machine speed upon determining the at least one trigger condition has been satisfied.

2. The method of claim 1 wherein the at least one trigger condition also includes at least one or more of: a automatic mode selected by an operator, a throttle being released, a machine brake not engaged, and an engine speed sufficient to prevent stall.

3. The method of claim 1 wherein the grade sensor is an accelerometer.

4. The method of claim 1 wherein a transmission gear is selected based on the grade and a weight of a load carried by the machine.

5. The method of claim 1 further comprising:
    increasing a level of powertrain retarding to prevent exceeding the maximum allowable machine speed when the maximum allowable machine speed is lower then the target machine speed.

6. The method of claim 1 wherein the maximum allowable machine speed is a function of the grade and a weight of a load carried by the machine.

7. The method of claim 1 wherein the powertrain retarder is deactivated when the throttle is engaged.

8. The method of claim 7 wherein the powertrain retarder is reactivated and a new target speed is set based on a new current speed when the throttle is again released.

9. The method of claim 1 wherein a level of powertrain retarding is increased to decrease machine speed below the target speed when a brake pedal is engaged and a new target speed is set based on a new current speed when the brake pedal is released.

10. The method of claim 1 wherein the powertrain retarder is deactivated when the grade is below the predetermined threshold.

11. The method of claim 1 wherein a current level of powertrain retarding is maintained when a change in a transmission gear is occurring.

12. The method of claim 1 wherein the powertrain retarder includes at least one of an engine brake and a transmission retarder.

13. A method for automatic speed control of a machine comprising:
    establishing a target machine speed based on a current machine speed;
    determining whether a trigger condition has been satisfied;
    activating a level of powertrain retarding to prevent exceeding the target machine speed upon determining the trigger condition has been satisfied; and
    increasing the level of powertrain retarding to decrease machine speed below the target speed when a brake pedal is engaged.

14. The method of claim 13 wherein the at least one trigger condition includes at least one or more of: a grade greater than a predetermined threshold, a automatic mode selected by an operator, a throttle being released, a machine brake not engaged, and an engine speed sufficient to prevent stall.

15. The method of claim 13 further including changing a transmission gear based on a grade and a weight of a load carried by the machine.

16. The method of claim 13 further including:
    determining a maximum allowable machine speed; and
    increasing the level of powertrain retarding to prevent exceeding the maximum allowable machine speed when the maximum allowable machine speed is lower than the target machine speed, wherein the maximum allowable machine speed is a function of a grade and a weight of a load carried by the machine.

17. The method of claim 13 further including:
    activating a level of powertrain retarding to prevent exceeding a new target machine speed based on a new current speed when the brake pedal is released.

18. A machine comprising:
    a throttle;
    an engine;
    a powertrain retarder;
    a transmission that changes gears based on the grade and a weight of a load carried by the machine when the grade of the machine is greater than a predetermined threshold and the throttle is released;
    a grade sensor; and
    a controller in electrical communication with the powertrain retarder and the grade sensor, wherein the controller activates the powertrain retarder to prevent exceeding a target machine speed when the grade sensor reports a grade of the machine is greater than a predetermined threshold and the throttle is released.

19. The machine of claim 18 wherein the grade sensor is a three-axis accelerometer.

* * * * *